May 22, 1956  B. L. TAYLOR  2,746,571
PORTABLE WHEEL POSITION INDICATOR
Filed Sept. 27, 1952

INVENTOR.
BERT L. TAYLOR
BY
ATTORNEY

United States Patent Office 2,746,571
Patented May 22, 1956

2,746,571
PORTABLE WHEEL POSITION INDICATOR

Bert L. Taylor, Cleveland, Ohio

Application September 27, 1952, Serial No. 311,899

1 Claim. (Cl. 188—32)

This invention relates to wheel chocks and particularly to a portable device for limiting the forward motion of a vehicle beyond a predetermined position.

Conducive to a better understanding of this invention, it may be well to point out that the average private garage is built with an overall interior length that will just accommodate an automobile with a foot or two clearance at the rear wall and the closed door thereof. To assure the proper closing of the door of such a garage, it is usually necessary to position the automobile with its front bumper in contact with the rear wall, or spaced not more than a few inches therefrom. Inasmuch as the front bumper of an automobile is out of the line of vision of the driver, this positioning maneuver is usually accomplished by the sense of touch or hearing, rather than sight. When done properly, the automobile is carefully inched forward until contact between the bumper and rear wall is felt by the driver. However if carelessly or hurriedly done, the automobile will be stopped by the rear wall rather than the brakes. As a result of this practice over a prolonged period of time, the rear wall becomes bowed out at the bumper-line and may even be pushed off its foundation.

The primary object of this invention, therefore, is to provide a wheel position indicator that will positively indicate to the driver, through his sense of touch, that contact with one of the wheels of the automobile has been made and, therefore, the vehicle has reached its proper stopping place with reference to the rear wall of the garage.

Another object is to provide a device of the type stated that will automatically stop forward movement of the vehicle beyond the indicated place, if the brakes are not applied.

A further object is to provide such a device that will maintain its proper position relative to the rear wall without any mechanical connection thereto or to the garage floor.

Still other objects are to provide a device that is portable, relatively light in weight, small in size and economical to manufacture.

These and other objects of the invention will become apparent from a reading of the following specification and claim, together with the accompanying drawing, wherein;

Figure 1:
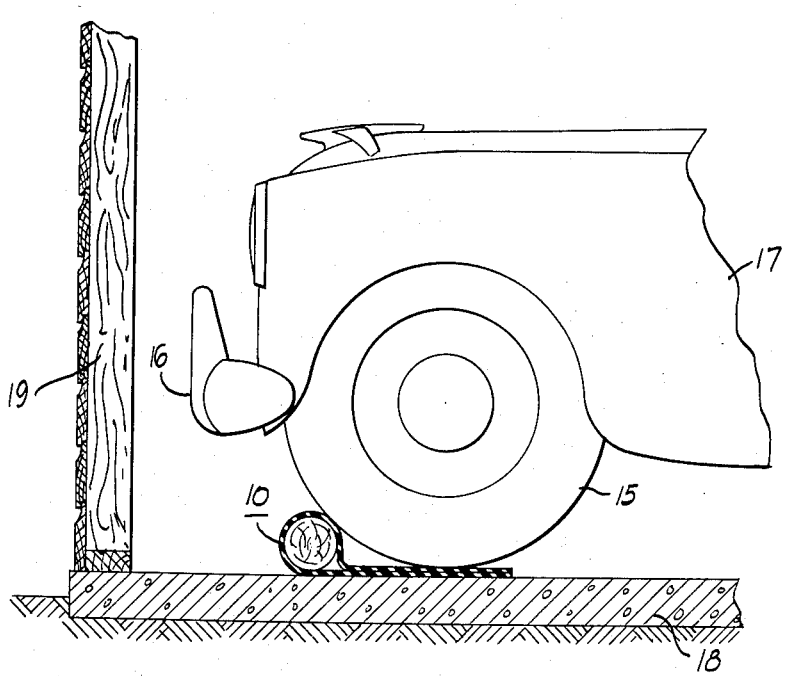
Figure 1 is a side elevation of the wheel position indicator, which is the subject of this invention, showing it as used to position an automobile with reference to the rear wall of a garage.

Similar characters of reference indicate corresponding parts throughout the various views and referring now to Figure 1, the character 10 indicates the wheel position indicator, which is the subject of this invention, resting on a garage floor 18 in spaced relation with the rear wall 19 of said garage. An automobile 17 is also shown with its left front wheel 15 resting on the indicator 10, whereby its front bumper 16 is positioned a predetermined distance from the rear wall 19.

Figure 2:
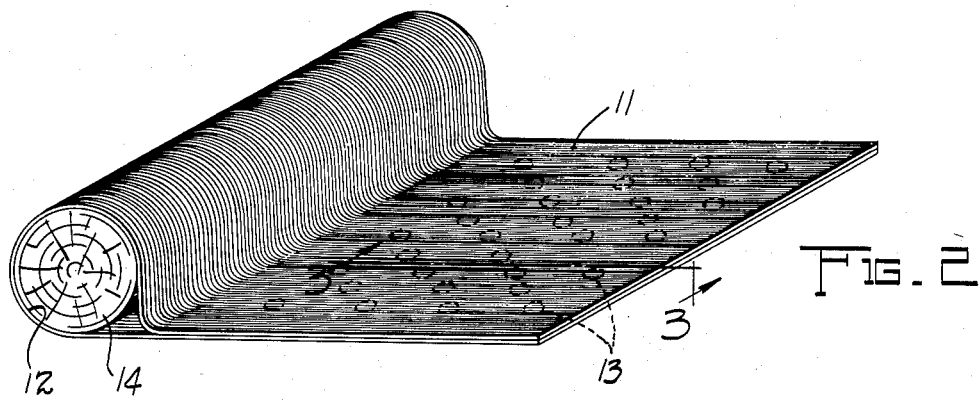
Figure 2 is a perspective view of the device.
Figure 3:
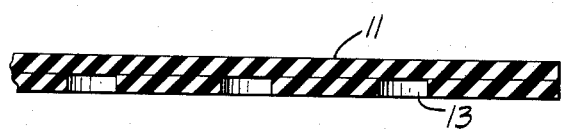
Figure 3 is a cross-sectional view taken along the line and in the direction of the arrows 3—3 of the Figure 2.

In its preferred form illustrated in the Figures 2 and 3, the position indicator 10 consists of a rectangular strip or mat of flexible but non-extensible rubber having a ribbed or otherwise roughened surface. The type of heavy rubber strip having a reinforcing inner layer of woven faric, such as is used as a floor covering, being suitable. This strip is folded upon itself to form a cylindrical hollow bumper portion 12 and an apron portion 11. The apron portion 11 being formed by cementing or vulcanizing the overlaid ends of the strip together to form a unitary member that will lie flat on the ground.

A rigid supporting member 14 is positioned within the hollow bumper portion 12. This supporting member is shown as taking the form of a cylindrical block of wood, although any other type of rigid supporting structure may be used such as an iron pipe or concrete cylinder of suitable diameter. That portion of the mat forming the under-side of the apron 11 has a plurality of holes 13 cut therethru, which form vacuum-cup like structures when the other end of the mat is cemented on top thereof, as shown in the Figure 3.

In the form shown, the apron is approximately 12 inches wide and the bumper portion 12 is four inches in diameter. The length of the apron 11 from its point of tangency to the bumper 12 is such that a wheel touching the bumper 12 will rest on the apron, as shown in the Figure 1.

In use, the position indicator 10 is layed on the garage floor in alignment with the track of the left front wheel of the vehicle. The bumper 12 being spaced from and parallel to the rear wall of the garage 19 a distance such that the vehicle bumper 16 will be spaced slightly from the wall 19, when the wheel 15 is in contact with the indicator bumper 12 as shown in Figure 1.

The automobile is driven slowly into the garage toward the rear wall, with its left front wheel 15 in alignment with the apron 11 of the position indicator 10. The wheel 15 is then driven onto the apron 11 until it touches the bumper portion 12, which occurrence will be indicated to the driver by a shock-wave transmitted through the steering wheel. Prompt application of the brakes will bring the vehicle to a stop at the pre-determined position relative to the rear wall and the garage door. The weight of the wheel 15 upon the apron 11 will compress the vacuum cups 13, thereby anchoring the apron securely to the floor 18, even if same has a smooth surface. The bumper cylinder 14 cannot be nudged out of position toward the rear wall by the forward momentum of the vehicle because it is held in place by the apron 11, which is in turn anchored on the floor by the weight of the vehicle wheel 15. The vehicle will be stopped even if the driver is tardy in applying the brakes, since the curved surface of the bumper cylinder 14 acts as a chock for the wheel 15.

The device described herein is portable and requires no mechanical attachment to any part of the garage. It will maintain its original position, due to the interaction of the apron 11 and bumper 12 with the vehicle wheel 15. Prolonged service will not cause it to lose its adjustment or creep toward the rear wall, as will ordinary pieces of 2 x 4's or blocks placed on the floor.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A portable chock for a vehicle wheel, comprising in combination, a flexible rubber sheet, of substantially rectangular shape, folded upon itself to form a flexible hollow cylindrical bumper portion, the two ends of the folded sheet being super-posed upon one another and cemented together to form a non-extensible apron lying substantially tangent to the bumper portion, and, a rigid cylinder fitted snugly within said flexible bumper portion and holding the same against collapse, the said bumper portion being free to flex relative to said rigid cylinder and apron when a tangential force is brought to bear against the circumferential face of the bumper portion by a rotating vehicle wheel resting on the apron.

References Cited in the file of this patent

UNITED STATES PATENTS

| | | |
|---|---|---|
| 1,023,682 | Reno | Apr. 16, 1912 |
| 1,283,788 | Jenkins | Nov. 5, 1918 |
| 1,392,987 | Unruh | Oct. 11, 1921 |
| 1,893,580 | Colley | Jan. 10, 1933 |
| 2,049,064 | Julien | July 28, 1936 |
| 2,438,563 | Kollmeyer | Mar. 30, 1948 |

FOREIGN PATENTS

| | | |
|---|---|---|
| 479,363 | Germany | July 15, 1929 |